United States Patent [19]

Martischius et al.

[11] Patent Number: 4,581,405

[45] Date of Patent: Apr. 8, 1986

[54] STABILIZATION OF DILUTE AQUEOUS SOLUTIONS OF HIGH MOLECULAR WEIGHT HOMOPOLYMERS AND COPOLYMERS BASED ON WATER-SOLUBLE ETHYLENICALLY UNSATURATED COMPOUNDS

[75] Inventors: Franz-Dieter Martischius, Neustadt; Wilfried Heide, Erpolzheim, both of Fed. Rep. of Germany

[73] Assignee: BASF Aktiengesellschaft, Ludwigshafen, Fed. Rep. of Germany

[21] Appl. No.: 653,586

[22] Filed: Sep. 24, 1984

[30] Foreign Application Priority Data

Sep. 22, 1983 [DE] Fed. Rep. of Germany ....... 3334226

[51] Int. Cl.[4] .......................... C08K 3/32; C08K 5/53; C08K 5/17; C08K 3/30
[52] U.S. Cl. .................................. 524/417; 523/175; 524/123; 524/124; 524/239; 524/418; 524/419; 524/521; 524/555; 252/8.55 D
[58] Field of Search ............... 523/175; 524/555, 123, 524/124, 239, 417, 521, 418, 419; 252/8.55 D

[56] References Cited

U.S. PATENT DOCUMENTS

| | | | |
|---|---|---|---|
| 3,766,120 | 10/1973 | Gershberg | 524/555 |
| 3,842,013 | 10/1974 | Booth | 524/555 |
| 4,069,161 | 1/1978 | Pogers | 524/555 |
| 4,110,230 | 8/1978 | Hessert | 524/555 |
| 4,116,896 | 9/1978 | Garrett | 524/555 |
| 4,125,478 | 11/1978 | Sullivan | 524/555 |
| 4,290,930 | 9/1981 | Nölken | 524/124 |
| 4,290,931 | 9/1981 | Nölken | 524/124 |
| 4,317,758 | 3/1982 | Bruning | 524/202 |
| 4,323,463 | 4/1982 | Morduchowitz | 252/8.55 D |
| 4,337,323 | 6/1982 | Adler | 524/239 |
| 4,433,727 | 2/1984 | Argabright | 252/8.55 D |
| 4,439,332 | 3/1984 | Frank | 252/8.55 D |
| 4,439,334 | 3/1984 | Borchardt | 252/8.55 D |

FOREIGN PATENT DOCUMENTS

| | | | |
|---|---|---|---|
| 0051264 | 5/1982 | European Pat. Off. | 524/555 |
| 55-62954 | 5/1980 | Japan | 524/555 |
| 0159839 | 10/1982 | Japan | 524/555 |
| WO84/00967 | 3/1984 | PCT Int'l Appl. | 524/555 |
| 471376 | 5/1975 | U.S.S.R. | 524/555 |

OTHER PUBLICATIONS

Periodic Table of Elements, Side 1, Sargent-Welch Scientific Company, 1979.
Chemical Abstracts, 82, 1975, 172029.
Chemical Abstracts, 91, 1979, 176219.

*Primary Examiner*—C. Warren Ivy
*Attorney, Agent, or Firm*—Oblon, Fisher, Spivak, McClelland & Maier

[57] ABSTRACT

Dilute aqueous solutions of high molecular weight polymers of acrylamide or methacrylamide or of homopolymers or copolymers of salts of ethylenically unsaturated $C_3$–$C_5$-carboxylic acids are stabilized to thermal degradation by adding (a) at least 20 ppm of an inorganic sulfur compound, in which the sulfur has an oxidation number of +2 to +5, and (b) at least 20 ppm of a complexing agent for metal ions.

7 Claims, No Drawings

STABILIZATION OF DILUTE AQUEOUS SOLUTIONS OF HIGH MOLECULAR WEIGHT HOMOPOLYMERS AND COPOLYMERS BASED ON WATER-SOLUBLE ETHYLENICALLY UNSATURATED COMPOUNDS

Aqueous solutions of homopolymers of acrylamide, of copolymers of acrylamide with comonomers containing anionic groups, e.g. sodium acrylate, ammonium acrylate or sodium vinylsulfonate, or of homopolymers of the monomers containing anionic groups are being used to an increasing extent for tertiary oil recovery and for reducing the flow resistance of water in heating systems. Although the polymers are stable in anhydrous form, the use of aqueous solutions of the stated polymers presents difficulties in practice because they are not sufficiently stable. At as low as about 50° C., the high molecular weight polymers of acrylamide or methacrylamide or the salts of polymers of ethylenically unsaturated acids undergo relatively rapid degradation in aqueous solution. This degradation can be readily monitored by measuring the viscosity of the aqueous solution. Of course, the degradation results in the polymers losing their activity as assistants in tertiary oil recovery or for reducing the flow resistance of water.

In practice, conditions are frequently met under which the aqueous solutions of homopolymers and copolymers of acrylamide or methacrylamide or the salts of polymeric ethylenically unsaturated acids have to be stable at 100° C. and above, for example when used as an additive to water to reduce the flow resistance in district heating systems and when employed for tertiary oil recovery at high reservoir temperatures.

As disclosed in *Chem. Abstr.* 82 (1975), 172029 a, about 4% strength aqueous polyacrylamide solutions have been stabilized with sodium ligninsulfonate. In solutions of this concentration, the viscosity was found to decrease by 23% after storage for 15 days at 50° C.

*Chem. Abstr.* 91 (1979), 176219 w, discloses that aqueous solutions of polyacrylamide can be stabilized using the sodium salt of 2-mercaptobenzimidazole. When the stabilized aqueous solution was stored for 5 days at 70° C., the viscosity was found to decrease by 0.7% compared with a 65% drop in viscosity in the case of the non-stabilized aqueous polyacrylamide solution.

European Patent Application No. 39,083 discloses that aqueous solution of acrylamide polymers which contain from 50 to 2,000 ppm of the polymer can be stabilized with sodium dithionite and sodium N,N-dimethyldithiocarbamate or 2-mercaptoethanol. Even when these mixtures are used, dilute aqueous solutions of polymers of acrylamide or of methacrylamide cannot be stabilized at above 100° C.

It is an object of the present invention to provide a process for stabilizing dilute aqueous solutions of high molecular weight homopolymers and copolymers based on water-soluble ethylenically unsaturated compounds to thermal degradation, in which the aqueous polymer solution obtained is stabilized to thermal degradation at above 100° C., or is at least more effectively stabilized than when the conventional additives are used.

We have found that this object is achieved, in accordance with the invention, if (a) at least 20 ppm of an inorganic sulfur compound, in which the sulfur has an oxidation number of $+2$ to $+5$, and (b) at least 20 ppm of a complexing agent for metal ions are added to dilute aqueous solutions of high molecular weight homopolymers and copolymers of acrylamide or methacrylamide and of homopolymers or copolymers of ethylenically unsaturated $C_3$–$C_5$-carboxylic acids.

According to the invention, the aqueous solutions of high molecular weight homopolymers and copolymers of acrylamide or methacrylamide or of the salts of ethylenically unsaturated acids are stabilized to degradation in aqueous solution. Polymers of this type are known, and are commercially available. The homopolymers of acrylamide, the copolymers of acrylamide with ethylenically unsaturated $C_3$–$C_5$-monocarboxylic acids, amidopropanesulfonic acids or vinyl sulfonate, and the homopolymers of the stated ethylenically unsaturated acids are particularly important for industrial use. The copolymers of acrylamide with the ethylenically unsaturated acids can be in the form of the sodium, potassium or ammonium salt or in partially neutralized form. Furthermore, the copolymers can be modified in that they contain, as copolymerized units, other monomers, for example acrylates of monohydric $C_1$–$C_{12}$-alcohols, methacrylates of the stated alcohols, acrylonitrile, methacrylonitrile or styrene. Moreover, the copolymers of acrylamide and of acrylic acid can contain, as copolymerized units, another ethylenically unsaturated carboxylic acid, e.g. methacrylic acid, or another monomer, e.g. sodium vinyl sulfonate. The copolymers contain, for example, from 1 to 99% by weight of one or more of the anionic monomers. The copolymers of methyacrylamide are prepared by, for example, copolymerizing methacrylamide with an ethylenically unsaturated $C_3$–$C_5$-carboxylic acid. The copolymerization can also be carried out using mixtures of several ethylenically unsaturated carboxylic acids, sodium vinyl sulfonate or amidopropanesulfonic acid. The number average molecular weight of the polymers is from 1 to 25,000,000. The high molecular weight polymers can furthermore be characterized with the aid of the Fikentscher K value, which is from 150 to 300 for these polymers (0.1% strength in 5% strength aqueous sodium chloride solution at 20° C.). According to the invention, the polymer content of the dilute aqueous solutions which contain the stated polymers and are stabilized is from 10 to 5,000, preferably from 100 to 1,500, ppm.

To effect stabilization, compounds from two different classes of substances are added to the polymer solutions. Component (a) is an inorganic sulfur compound in which the sulfur has an oxidation number of $+2$ to $+5$. Examples of compounds of this type are the alkali metal sulfites, dithionites, pyrosulfites and thiosulfates, the sodium and potassium salts being of particular industrial importance in this case.

The stabilized dilute aqueous polymer solutions contain, as a second component, a complexing agent for metal ions. Examples of such products are aminopolycarboxylic acids, such as nitrilotriacetic acid, ethylenediaminetetraacetic acid or diethylenetriaminepentaacetic acid, their sodium and potassium salts, organic acids of phosphorus, such as hydroxyethanediphosphonic acid, nitrilotrismethylenephosphonic acid and/or hexametaphosphoric acid and/or their sodium and potassium salts, and polymeric complexing agents, such as homopolymers and/or copolymers of ethylenically unsaturated $C_3$–$C_5$-carboxylic acids having a K value of from 10 to 70, preferably from 20 to 50, e.g. polyacrylic acid and/or copolymers of acrylic acid and, for example, acrylamide, sodium acrylate, potassium acrylate and/or basic acrylates and/or basic acrylamides.

Other suitable components (b) are condensed inorganic phosphates, e.g. sodium hexametaphosphate or potassium hexametaphosphate. Effective stabilization is achieved if the aqueous solutions of high molecular weight homopolymers and copolymers of acrylamide or of methacrylamide or of the salts of polymeric ethylenically unsaturated carboxylic acids contain at least 20 ppm of component (a) and at least 20 ppm of component (b).

Aqueous polymer solutions whose stability also meets practical requirements preferably contain at least 50 ppm, based on the polymer solution, of component (a) and at least 50 ppm, based on the polymer solution, of component (b). In these cases, the dilute aqueous polymer solutions are very stable even at above 100° C. Since electrolytes such as the compounds of component (a) have a pronounced effect on the viscosity of the aqueous solutions of polymers of acrylamide or of methacrylamide, the maximum amount of component (a) which can be added depends on the viscosity permitted for the aqueous solution when used for the particular application. Preferably, the compounds of component (a) are used in amounts of from 50 to 150 ppm, and those of component (b) are employed in amounts of from 25 to 100 ppm. Within this range, it has proven advantageous if the ratio of compounds of component (a) to those of component (b) is 2:1.

The addition of compounds according to (a) and (b) to dilute aqueous solutions of high molecular weight homopolymers and copolymers of acrylamide or of methacrylamide, or of the salts of polymeric ethylenically unsaturated carboxylic acids, produces extraordinary stabilization of the aqueous polymer solutions. For example, the polymer solutions stabilized according to the invention can be used for reducing the flow resistance of water in heating systems over a prolonged period, for example even at above 100° to 150° C., without any noticeable loss of activity. Because of this property, the aqueous polymer solutions stabilized according to the invention are also particularly useful in tertiary oil recovery in reservoirs where high reservoir temperatures are found. Compared with the conventional stabilizing agents, an unforeseeable increase in the stability of dilute aqueous polymer solutions is achieved according to the invention. For example, at a reservoir temperature of 68° C., a polyacrylamide solution stabilized according to the invention showed a decrease in viscosity of only 8% in the course of 60 days.

The K value of the polymers which is stated in the Examples was measured in accordance with H. Fikentscher, *Cellulose-Chemie* 13 (1932), 58–64 and 71–74, on a 0.1% strength solution in 5% strength aqueous sodium chloride solution at 20° C.; $K = k \cdot 10^3$.

The flow resistance was determined using a heatable tube section having a diameter of 3.2 mm and a length of 150 mm. A polymer solution was pumped through this tube section from a stock vessel, and the pressure at the beginning and at the end of the tube section was measured with the aid of a pressure gauge, and the pressure difference ($\Delta p$) was calculated. The entire apparatus could be heated.

The reduction W in the flow resistance is defined as $$W = 1 - (\Delta P_{Pol}/\Delta P_w),$$

where $\Delta P_{Pol}$ is the pressure difference for the polymer solution, and $\Delta P_w$ is the pressure difference for water. The flow rate (Re = 80,000) and the temperature were kept constant in both measurements.

EXAMPLE 1

An aqueous solution containing 100 ppm of a copolymer of 70% of acrylamide and 30% of sodium acrylate, having a K value of 280, was prepared and the amounts of sodium ethylenediaminetetraacetate (EDTA-Na) and sodium sulfite stated in Table 1 were added. The aqueous solution was heated to 150° C. in the course of 4 hours, under superatmospheric pressure, after which the pressure difference was determined after the times stated in Table 1. The reductions W in flow resistance which are stated in Table 1 were determined.

TABLE 1

|  | EDTA-Na | $Na_2SO_3$ | Reduction W in flow resistance after | | | |
|---|---|---|---|---|---|---|
|  |  |  | 0 h | 5 h | 10 h | 15 h |
| Example 1 | 50 ppm | 100 ppm | 0.8 | 0.8 | 0.8 | 0.8[1] |
| Comparative Example 1 | — | — | 0.75 | 0.25 | 0.1 | 0 |
| Comparative Example 2 | 10 ppm | 100 ppm | 0.7 | 0.45 | 0.35 | 0.25 |
| Comparative Example 3 | 50 ppm | — | 0.7 | 0.35 | 0.25 | 0.2 |

[1] After 20 days: 0.8

EXAMPLES 2 TO 5

The substances stated in Table 2 were added to the polymer solution described in Example 1, and the polymer solution stabilized in this manner was then heated to 150° C. The reduction W in flow resistance was determined immediately after 150° C. was reached, and after 20 hours. The results are shown in Table 2.

TABLE 2

|  | EDTA-Na | $Na_2SO_3$ | W after | |
|---|---|---|---|---|
|  |  |  | 0 h | 20 h |
| Example 2 | 50 ppm | 100 ppm | 0.8 | 0.8 |
| Example 3 | 40 ppm | 100 ppm | 0.8 | 0.8 |
| Example 4 | 25 ppm | 100 ppm | 0.8 | 0.8 |
| Example 5 | 50 ppm | 50 ppm | 0.8 | 0.8 |

EXAMPLE 6

An aqueous polymer solution which contained 1,000 ppm of a copolymer of 70% of acrylamide and 30% of sodium acrylate, having a K value of 280, was stabilized by adding 50 ppm of sodium diethylenetriaminepentaacetate and 100 ppm of sodium sulfite, and the resulting solution was heated to 150° C. At a shear rate of $5 \cdot 10^{-3}$ sec.$^{-1}$, the viscosity was found to be 960 mPa·s, while the viscosity of the stabilized polymer solution after 96 hours was 580 mPa·s.

EXAMPLE 7

An aqueous solution, which contained 600 ppm of a copolymer of 70% of acrylamide and 30% of sodium acrylate, having a K value of 280, 25 ppm of sodium ethylenediaminetetraacetate and 100 ppm of sodium sulfite, was heated to 68° C. The viscosity was measured after this temperature was reached and after 60 days, at two different shear rates. The results are shown in Table 3.

TABLE 3

| Shear rate | t = 0 | t = 60 d |
|---|---|---|
| $5 \cdot 10^{-3} s^{-1}$ | 122 mPa·s | 95 mPa·s |
| $10 s^{-1}$ | 50 mPa·s | 46 mPa·s |

COMPARATIVE EXAMPLE 4

An aqueous solution which contained 1,000 ppm of a copolymer of 70% of acrylamide and 30% of sodium acrylate, having a K value of 280, was heated to 150° C. At a shear rate of $5.10^{-3}$ sec.$^{-1}$, the viscosity was found to be 1,550 mPa·s, while the viscosity after 96 hours was 18 mPa·s.

COMPARATIVE EXAMPLE 5

An aqueous solution which contained 600 ppm of a copolymer of 70% of acrylamide and 30% of sodium acrylate, having a K value of 280, was heated to 68° C. The viscosity was measured immediately and after 60 days, at two different shear rates. The results obtained are shown in Table 4.

TABLE 4

| Shear rate | t = 0 | t = 60 d |
|---|---|---|
| $5 \cdot 10^{-3} s^{-1}$ | 135 mPa·s | 24 mPa·s |
| $10 s^{-1}$ | 55 mPa·s | 21 mPa·s |

EXAMPLE 8

The effectiveness of a solution of 100 ppm of a copolymer of 70% of acrylamide and 30% of sodium acrylate in reducing the flow resistance was tested as described in Example 1. Stabilization was effected by adding 100 ppm of sodium sulfite and 100 ppm of a polyacrylic acid having a K value of 45. W was 0.79 after the heating procedure, and 0.77 after 16 hours.

EXAMPLE 9

Example 8 was repeated, except that stabilization was effected by using 100 ppm of sodium sulfite and 100 ppm of sodium hexametaphosphate. W was 0.65 after the heating procedure, and 0.56 after 16 hours.

EXAMPLE 10

Example 8 was repeated, except that stabilization was effected by using 50 ppm of disodium hydroxyethanediphosphate and 100 ppm of sodium dithionite. W was 0.80 after the heating procedure and 0.79 after 16 hours.

EXAMPLE 11

The effectiveness of a solution of 100 ppm of an acrylamide homopolymer having a K value of 240 in reducing the flow resistance was tested as described in Example 1. Stabilization was effected by adding 100 ppm of sodium pyrosulfite and 50 ppm of sodium ethylenediaminetetraacetate. W was 0.53, both after the heating procedure and after 16 hours.

EXAMPLE 12

The effectiveness of a solution of 100 ppm of a sodium acrylate homopolymer having a K value of 230 in reducing the flow resistance was tested as described in Example 1. Stabilization was effected by adding 100 ppm of sodium thiosulfate and 50 ppm of sodium diethylenetriaminepentaacetate. W was 0.63 after the heating procedure and 0.61 after 16 hours.

We claim:

1. A process for improving the stability of dilute aqueous polymer solutions to thermal degradation, said solutions containing from 10 to 5,000 ppm of a high molecular weight polymer having a K value according to Fikentscher of from 150 to 300 and being selected from the group consisting of homopolymers and copolymers of acrylamide, methacrylamide, ethylenically unsaturated monocarboxylic acids of 3 to 5 carbon atoms, and the sodium, potassium and ammonium salts of these acids, by adding to the dilute aqueous polymer solutions
    (a) at least 20 ppm of an inorganic sulfur compound, in which sulfur has an oxidation number of +2 to +5, and
    (b) at least 20 ppm of a complexing agent for metal ions, wherein the said complexing agent comprises nitrilotriacetic acid, ethylene-diaminetetraacetic acid, diethylenetriamine-pentaacetic acid, a sodium salt of nitrilotriacetic acid, a potassium salt of nitrilotriacetic acid, a sodium salt of ethylenediaminetetraacetic acid, a potassium salt of ethylenediaminetetraacetic acid, a sodium salt of diethylenetriaminepentaacetic acid, a potassium salt of diethylenetriaminepentaacetic acid, hydroxyethanediphosphonic acid, nitrilotrismethylenephosphonic acid, hexametaphosphoric acid, a sodium salt of hydroxyethanediphosphonic acid, a potassium salt of hydroxyethanediphosphonic acid, a sodium salt of nitrilotrismethylenephosphonic acid, a potassium salt of nitrilotrismethylenephosphonic acid, a sodium salt of hexametaphosphoric acid, a potassium salt of hexametaphosphoric acid, or a homopolymer or copolymer of an ethylenically unsaturated $C_3-C_5$-carboxylic acid having a K value of from 10 to 70 and comprising polyacrylic acid, a copolymer of acrylic acid and acrylamide, a copolymer of acrylic acid and sodium acrylate, a copolymer of acrylic acid and potassium acrylate, a copolymer of acrylic acid and a basic acrylate, a copolymer of acrylic acid and a basic acrylamide or a mixture thereof.

2. A process as claimed in claim 1, wherein component
    (a) is sodium or potassium sulfite, dithionite, pyrosulfite or thiosulfate, and component
    (b) comprises nitrilotriacetic acid, ethylenediaminetetraacetic acid, diethylenetriaminepentaacetic acid, a sodium salt of nitrilotriacetic acid, a sodium salt of ethylenediaminetetraacetic acid, a sodium salt of diethylenetriaminepentaacetic acid, a potassium salt of nitrilotriacetic acid, a potassium salt of ethylenediaminetetraacetic acid or a potassium salt of diethylenetriaminepentaacetic acid.

3. A process as claimed in claim 1, wherein component
    (a) is sodium or potassium sulfite, dithionite, pyrosulfite or thiosulfate, and component
    (b) comprises hydroxyethanediphosphonic acid, nitrilotrismethylenephosphonic acid, hexametaphosphoric acid, a sodium salt of hydroxyethanediphosphonic acid, a sodium salt of nitrilotrismethylenephosphonic acid, a sodium salt of hexametaphosphoric acid, a potassium salt of hydroxyethanediphosphonic acid, a potassium salt of nitrilotrismethylenephosphonic acid or a potassium salt of hexametaphosphoric acid.

4. A process as claimed in claim 3, wherein component (b) comprises sodium hexametaphosphate or potassium hexametaphosphate.

5. A process as claimed in claim 1, wherein the compounds of component (a) are used in amounts of from 50 to 150 ppm, and those of component (b) are employed in amounts of from 25 to 100 ppm.

6. A process as claimed in claim 1, wherein the compounds of component (a) are used in amounts of from 50 to 150 ppm, those of component (b) are employed in amounts of from 25 to 100 ppm, and the ratio of (a) to (b) is 2:1.

7. The process of claim 1, wherein the high molecular weight polymer content of the dilute aqueous solution is from 100 to 1500 ppm.

* * * * *